Figure 1:
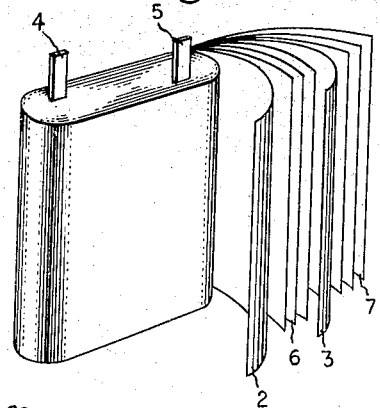
Figure 2:
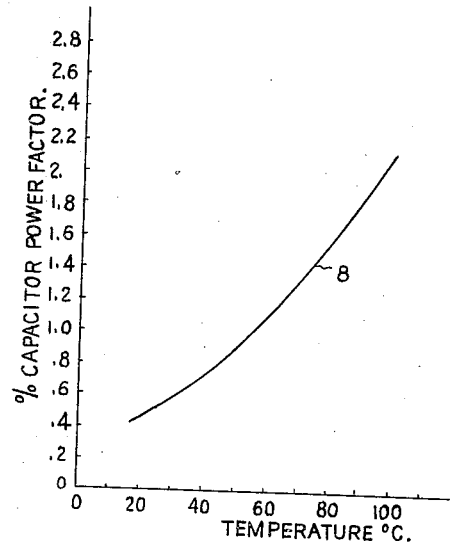

July 20, 1948.    F. M. CLARK    2,445,563
DIELECTRIC COMPOSITION
Filed July 10, 1946    2 Sheets-Sheet 1

CONTAINS DICHLOR NITRO-
NAPHTHALENE BLENDED
WITH ANOTHER HALOGEN-
ATED HYDROCARBON.

Inventor:
Frank M. Clark,
by Harry E. Dunham
His Attorney.

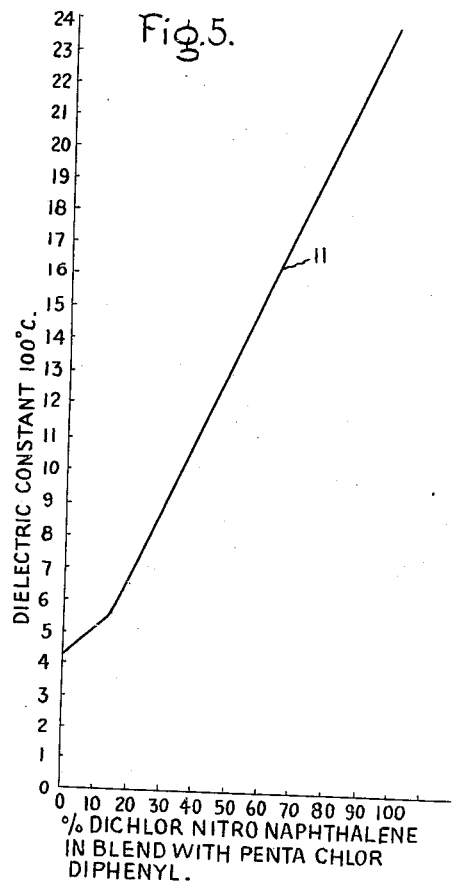
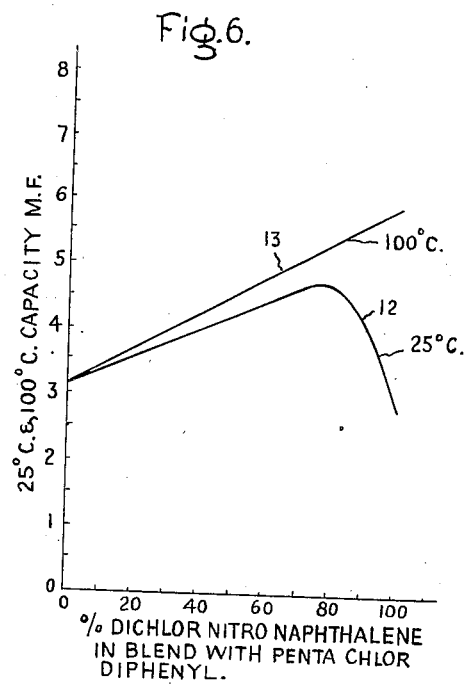
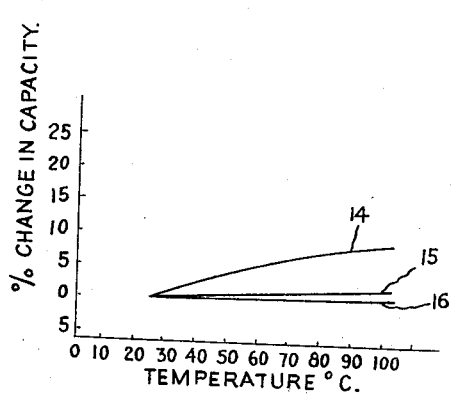
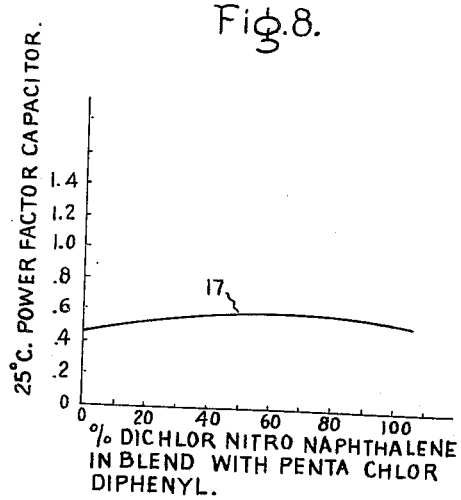

Patented July 20, 1948

2,445,563

UNITED STATES PATENT OFFICE 2,445,563

DIELECTRIC COMPOSITION

Frank M. Clark, Pittsfield, Mass., assignor to General Electric Company, a corporation of New York Application July 10, 1946, Serial No. 682,545

4 Claims. (Cl. 252—63.7)

The present invention comprises new compositions suitable for use in capacitors, cables and other electric devices. These compositions comprise as essential ingredients dichlor alpha nitronaphthalene and one or more halogenated aryl hydrocarbons.

Dichlor alpha nitronaphthalene is a crystalline solid material which heretofore has not been of interest in the dielectric field. The marked capacity variation with temperature and the rapid increase in power factor with rise of temperature of capacitors treated solely with dichlor alpha nitronaphthalene would make such capacitors of little or no practical value.

I have discovered that capacitors impregnated with dielectric compositions comprising as essential ingredients both dichlor alpha nitronaphthalene and one or more other suitable chosen halogenated aryl hydrocarbons, such, for example, as chlorinated or fluorinated diphenyl, diphenyl oxide, diphenyl methane and the like, are characterized by the high capacity values characteristic of dichlor alpha nitronaphthalene in the liquefied state and possess a substantially constant electrical capacity over the range of temperature met with in industrial use. In other words, my present invention provides dielectric compositions possessing both unexpectedly high capacity characteristics and temperature stability.

The accompanying drawing shows in Fig. 1 conventionally a capacitor embodying my invention and Figs. 2 to 8 are graphs of electrical characteristics either of compositions per se or of capacitors containing such compositions as will be explained hereinafter.

Dichlor alpha nitronaphthalene may be prepared in accordance with known methods. For example, alpha nitronaphthalene may be chlorinated in the presence of a catalyst such as iron or ferric chloride. The chlorination preferably is carried out at a temperature which is progressively increased from about 60 to 100° C. as the chlorination progresses to a weight increase of 29.6% which corresponds to the desired dichlor compound. The chlorinated product may be distilled under vacuum to avoid excessive decomposition. The distilled product which consists of the desired dichlor compound is washed with dilute aqueous alkali for example about 3% sodium hydroxide in water. In order to obtain the optimum dielectric properties, the dichlor alpha nitronaphthalene is treated with fuller's earth, for example, by a process whereby 3% by weight of fine fuller's earth (80–300 mesh) is stirred with the chlorinated nitronaphthalene at about 75° C. for a period up to 15 minutes or 30 minutes, the fuller's earth then being removed by filtration.

Dichlor alpha nitronaphthalene so prepared is a light yellow crystalline compound having an indefinite melting point in the vicinity of about 72° C. At 100° C. it is a liquid with a specific gravity of 1.448 as compared to water at 15.5° C. and a viscosity of about 48 seconds Saybolt Universal. At 25° C., solid dichlor alpha nitronaphthalene has a dielectric constant of 4.5. At 100° C., the liquid dichlor alpha nitronaphthalene has a dielectric constant of about 23.6. The change from a solid to a liquid state results in a marked change in the capacity of a capacitor impregnated with the dichlor alpha nitronaphthalene as the temperature varies over the usual range of capacitor operation.

Capacitors such as shown in Fig. 1 have aluminum foil electrodes 2, 3 of the type normally used in commercial capacitor manufacture, external contacts 4, 5 and contain spacers 6, 7 comprising sets of three sheets of .0004" kraft paper. When impregnated with the dichlor alpha nitronaphthalene, in accordance with approved technique, such impregnated capacitors have a power factor of about .5% at 25° C. As shown in graph 8 of Fig. 2, the power factor rises rapidly with rise of temperature and exceeds 2% at 100° C. This value is too high to be tolerated in good engineering practice.

Figure 3:
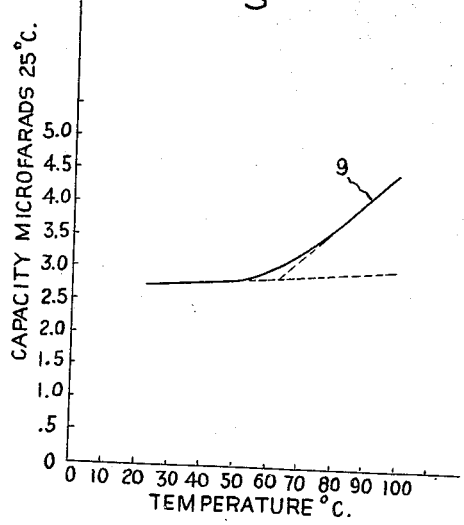

As shown by graph 9, Fig. 3, there is a small increase in the electrical capacity of a capacitor thus impregnated for the temperature range of 25° C. to 50° C. At higher temperatures the capacity increases more rapidly. As indicated by the dotted lines of Fig. 3 the critical capacity variation occurs at approximately 63° C. This is about 9° C. below the melting point of the impregnating dichlor alpha nitronaphthalene. Below 63° C. the capacity change with temperature is determined by the characteristics of the solid dichlor alpha nitronaphthalene. Above 63° C. the capacity change with temperature is determined by the characteristics of the liquefied dichlor alpha nitronaphthalene.

Unexpectedly the advantageous dielectric properties of liquid dichlor alpha nitronaphthalene dielectric may be obtained by associating a major proportion of the chlorinated naphthalene compound with a minor proportion of another and unlike halogenated aromatic hydrocarbon.

Although compositions of dichlor alpha nitronaphthalene and pentachlor diphenyl are preferred for some applications of my invention, other liquid chlorinated derivations of diphenyl such as the tetrachlor and hexachlor diphenyl and similar derivatives of diphenyl oxide, diphenyl methane may be blended with dichlor alpha nitronaphthalene in place of pentachlor diphenyl.

Figure 4:
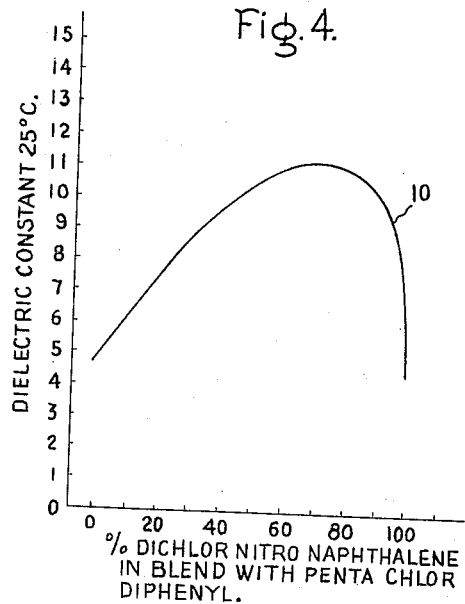

Graph 10 of Fig. 4 shows the dielectric constants at 25° C. of compositions containing a range of percentages of dichlor alpha nitronaphthalene. A dielectric constant of approximately 11 is characteristic of a composition comprising approximately 60 to 80% of dichlor alpha nitronaphthalene and a complementary amount of pentachlor diphenyl. As will be apparent from the graph, some latitude is permissible in range of ingredients.

The lower than expected value of dielectric constant at this temperature which is obtained with the composition of 60 to 80% alpha nitro dichlor naphthalene blended with 40 to 20% of penta chlorinated diphenyl is ascribable to the fact such a composition is a mushy, semi-solid substance at 25° C., being composed of dichlor alpha nitronaphthalene both in solution and in suspension in the liquid pentachlor diphenyl. At higher temperatures the dielectric constant of such compositions increases with the content of the naphthalene compound. This is made evident by graph 11, Fig. 5, taken at 100° C.

Capacitors treated with dichlor alpha nitronaphthalene, show an increase of capacity at 100° C. amounting to about 105% over the capacity of the same capacitor at 25° C. This wide change in capacity impregnated capacitors is undesirable. Capacitors treated with pentachlor diphenyl undergo a drop of electrical capacity of only 2% in going from 25° C. to 100° C.

A high degree of stability is obtained with capacitors treated with a composition containing about 80 parts of pentachlor diphenyl and 20 parts of the dichlor alpha nitronaphthalene while at the same time the electrical capacity is increased 13% over capacitors treated with pentachlor diphenyl alone.

For many electrical applications an increase in the electrical capacity of the treated capacitor of about 10% over the temperature range from 25° C. to 100° C. can be tolerated. For these applications, capacitors treated with a dielectric composition containing 75% of dichlor alpha nitronaphthalene and 25 percent pentachlor diphenyl, or equivalent liquid halogenated aryl hydrocarbon, can be used with a gain of 32 percent in electrical capacity as compared to the capacity obtained with similar capacitors treated solely with pentachlor diphenyl.

In Fig. 6 the electrical capacities of 440 volt capacitors having a dielectric spacer of three sheets of .0004" kraft paper and being impregnated with compositions comprising pentachlor diphenyl and dichlor alpha nitronaphthalene blends are illustrated by graphs 12 and 13 for 25° C. and 100° C. respectively. Capacitors treated with unmodified dichlor alpha nitronaphthalene show a capacity increase from 2.8 microfarads at 25° C. to 5.9 microfarads at 100° C., an increase of 100%. The electrical capacity (2.8) at 25° C. is lower than the capacity obtained with similar capacitors treated with pentachlor diphenyl (3.1), unassociated with dichlor alpha nitronaphthalene. This variation together with the abnormal temperature effect on capacity has precluded the industrial utilization of capacitors treated with unmodified dichlor alpha nitronaphthalene.

When containing selected compositions of pentachlor diphenyl and dichlor alpha nitronaphthalene as the capacitor impregnant, capacitors are characterized by greater electrical capacity at all temperatures than is obtainable when either pentachlor diphenyl or dichlor alpha nitronaphthalene issued as the sole capacitor impregnant. Furthermore the effect of temperature on the electrical capacity of the capacitor is greatly reduced from that observed when dichlor alpha nitronaphthalene is used as the sole impregnant.

In Fig. 7, the increase in the electrical capacity of capacitors treated with impregnating compositions containing dichlor alpha nitronaphthalene is illustrated. Using a dielectric impregnating composition containing 75 parts by weight of the dichlor alpha nitronaphthalene and 25 parts of pentachlor diphenyl, the electrical capacity of the capacitor is increased 9%, as shown by graph 14 when the temperature rises from 25 to 100° C. Graphs 15 and 16 show the characteristic when the amount of petachlor diphenyl is respectively increased to 75% and to 85%, the naphthalene compound being correspondingly reduced.

Capacitors treated with dielectric compositions of pentachlor diphenyl and dichlor alpha nitronaphthalene are characterized by having a higher electrical capacity than similar capacitors treated with dichlor alpha nitrodiphenyl and are not characterized by a prohibitively high power factor. In most capacitor applications, such as for power factor correction motors, fluorescent lamps and the like, the smallest unit of physical volume per microfarad of electrical capacity is desired without marked change of capacity when the temperature varies.

In Fig. 8, graph 17 of power factor values taken at 25° C. of capacitors impregnated with compositions containing a range of percentages of dichlor alpha nitronaphthalene and complementary amounts of pentachlor diphenyl. As heretofore stated, various equivalents may be substituted for the pentachlor diphenyl. As is evident there is little change in power factor over the entire range of compositions.

What I claim as new and desire to secure by Letters Patent of the United States is:

1. A composition which is suitable for dielectric purposes and consists of about 60 to 80 percent of dichlor alpha nitronaphthalene and about 40 to 20 percent of halogenated polyphenyl hydrocarbon.

2. A composition which is suitable for dielectric purposes and consists of about 60 to 80 percent of dichlor alpha nitronaphthalene and about 40 to 20 percent of chlorinated diphenyl.

3. A composition which is suitable for dielectric purposes and consists of about 60 to 80 percent of dichlor alpha nitronaphthalene and about 40 to 20 percent pentachlor diphenyl.

4. A composition which is suitable for dielectric purposes and consists of about 60 to 80 percent of dichlor alpha nitronaphthalene and about 40 to 20 percent pentachlor diphenyl oxide.

FRANK M. CLARK.

REFERENCES CITED

The following references are of record in the file of this patent:

UNITED STATES PATENTS

| Number | Name | Date |
| --- | --- | --- |
| 1,988,300 | Clark | Jan. 15, 1935 |
| 2,019,337 | Clark | Oct. 29, 1935 |
| 2,227,637 | Engelhardt | Jan. 7, 1941 |
| 2,374,973 | Biggs et al. | May 1, 1945 |
| 2,402,872 | Clark | June 25, 1946 |